United States Patent
Pantel et al.

(10) Patent No.: US 10,509,837 B2
(45) Date of Patent: *Dec. 17, 2019

(54) MODELING ACTIONS FOR ENTITY-CENTRIC SEARCH

(71) Applicant: Microsoft Technology Licensing, LLC, Redmond, WA (US)

(72) Inventors: Patrick Pantel, Bellevue, WA (US); Michael Gamon, Seatle, WA (US); Anitha Kannan, Saratoga, CA (US); Ariel Fuxman, San Francisco, CA (US); Thomas Lin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,634

(22) Filed: Aug. 22, 2017

(65) Prior Publication Data

US 2017/0351772 A1    Dec. 7, 2017

Related U.S. Application Data

(63) Continuation of application No. 13/311,581, filed on Dec. 6, 2011, now Pat. No. 9,767,201.

(51) Int. Cl.
*G06F 16/9535* (2019.01)

(52) U.S. Cl.
CPC ................. *G06F 16/9535* (2019.01)

(58) Field of Classification Search
CPC .......... G06F 17/30867; G06F 16/9535
See application file for complete search history.

(56) References Cited

U.S. PATENT DOCUMENTS

| | | | |
|---|---|---|---|
| 7,283,992 B2 | 10/2007 | Liu et al. | |
| 7,657,493 B2 | 2/2010 | Meijer et al. | |
| 8,229,873 B1* | 7/2012 | Dolan | G06Q 30/00 706/45 |
| 2003/0033292 A1 | 2/2003 | Meisel et al. | |
| 2005/0234761 A1 | 10/2005 | Pinto et al. | |
| 2007/0100650 A1 | 5/2007 | Ramer et al. | |
| 2009/0094196 A1* | 4/2009 | Piwowarski | G06F 17/30864 |
| 2009/0249198 A1 | 10/2009 | Davis et al. | |

(Continued)

OTHER PUBLICATIONS

Bautin, et al., "Concordance-Based Entity-Oriented Search", EEE/WIC/ACM International Conference on Web Intelligence, Nov. 2-5, 2007, pp. 586-592. Retrieved at <http://bautin.org/pdf/entity_oriented_search.pdf>.

(Continued)

*Primary Examiner* — Cam Y T Truong
(74) *Attorney, Agent, or Firm* — International IP Law Group, PLLC

(57) ABSTRACT

In one embodiment, a web service engine server 104 may predict a successive action by a user based on an entity reference 302. The web service engine server 104 may identify an entity reference 302 in a data transmission caused by a user. The web service engine server 104 may determine from the data transmission a user intention towards the entity reference 302 using an intention model based on a transmission log. The web service engine server 104 may predict a related successive web action option 522 for the entity reference 302 based on the user intention.

14 Claims, 9 Drawing Sheets

(56) References Cited

U.S. PATENT DOCUMENTS

| | | | |
|---|---|---|---|
| 2010/0057687 A1* | 3/2010 | Shen | G06F 17/3064 |
| 2010/0082604 A1 | 4/2010 | Gutt et al. | |
| 2010/0312746 A1 | 12/2010 | Thollot et al. | |
| 2011/0173680 A1 | 7/2011 | Bates et al. | |
| 2011/0179081 A1 | 7/2011 | Ovsjanikov et al. | |
| 2011/0208730 A1* | 8/2011 | Jiang | G06F 16/951 707/727 |
| 2011/0231347 A1 | 9/2011 | Xu et al. | |
| 2012/0036137 A1 | 2/2012 | Naidu et al. | |
| 2012/0089996 A1* | 4/2012 | Ramer | H04H 60/46 725/14 |
| 2012/0191745 A1 | 7/2012 | Velipasaoglu et al. | |
| 2013/0086029 A1* | 4/2013 | Hebert | G06F 17/30864 707/706 |
| 2013/0144854 A1 | 6/2013 | Pantel et al. | |
| 2013/0211909 A1* | 8/2013 | Tanaka | G06Q 30/0246 705/14.45 |

OTHER PUBLICATIONS

Zhang, et al., "Using Action-Object Pairs as a Conceptual Framework for Transaction Log Analysis", 2009, pp. 414-433. Retrieved at <http://faculty.ist.psu.edu/jjansen/academic/jansen_action_object_pairs.pdf>.

Taghipour, et al., "Using Q-Learning for Web Recommendations from Web Usage Data", 12th International CSI Computer Conference {CSICC'07), Feb. 20-22, 2007, 4 Pages. Retrieved at <http://ceit. aut.ac.ir/-shiry/publications/Q-learning-Web-Usagae.pdf>.

Balasubramanian, et al., "Topic Pages: An Alternative to the Ten Blue Links", Conference on Semantic Computing (ICSC), IEEE Fourth International , 2010, pp. 353-360. Retrieved at <http://research. microsoft.com/en-us/people/silviu/ieee-icsc1O.pdf>.

Blei, et al., "Latent Dirichlet Allocation", The Journal of Machine Learning Research, vol. 3, Jan. 2003, pp. 993-1022. Retrieved at <http://www.inf.ed.ac.uk/teaching/courses/dme/readings2010/BleiNgJordan2003.pdf>.

Broder, et al., "A Taxonomy of Web Search", SIGIR Forum, vol. 36, No. 2, 2002, pp. 3-10. Retrieved at <http://sysnet.cs.williams.edu/-irwin/cs11/taxonomy. pdf>.

Broder, et al., "Robust Classification of Rare Queries Using Web Knowledge", Proceedings of the 30th Annual International ACM SIGIR Conference on Research and Development in information Retrieval, Jul. 23-27, 2007, 8 Pages. Retrieved at <http://www.stat.rutgers.edu/home/tzhang/papers/sigir07.pdf>.

Carman, et al., "Towards Query Log Based Personalization using Topic Models", Proceedings of the 19th ACM International Conference on Information and Knowledge Management (CIKM), Oct. 26-30, 2010, pp. 1849-1852. Retrieved at <http://bradipo.net/ mark/papers/cikm2010_p1849-carman.pdf>.

Cucerzan, Silviu, "Large-Scale Named Entity Disambiguation Based on Wikipedia Data", Proceedings of the 2007 Joint Conference on Empirical Methods in Natural Language Processing and Computational Natural Language Learning (EMNLP), Jun. 2007, pp. 708-716. Retrieved at <http:1/acl. 1dc.upenn.edu/D/D07/D07-1074.pdf>.

Davli, et al., "A Web of Concepts", Proceedings of PODS, Jun. 29-Jul. 2, 2009, 12 Pages. Retrieved at <http://69.147.108.248/files/pods09-woc.pdf>.

Dupret, et al., "A User Behavior Model for Average Precision and its Generalization to Graded Judgments", Proceedings of SIGIR, Jul. 19-23, 2010, pp. 531-538. Retrieved at <http://59.108.48.12/proceedings/sigir/sigir2010/docs/p531.pdf>.

Gimpel, et al., "Part-of-speech Tagging for Twitter: Annotation, Features, and Experiments", In Proceedings of ACL, 2011, pp. 42-47. Retrieved at <http:// www.ark.cs.cmu.edu/TweetNLP/gimpel+etal.acl11.pdf>.

Guo, et al., "Named Entity Recognition in Query", Proceedings of the 32nd international ACM SIGIR Conference on Research and Development in information Retrieval (SIGIR), Jul. 19-23, 2009, pp. 267-274. Retrieved at <http://research.microsoft.com/en-us/people/hangli/ guo-etal-sigir2009.pdf?q=halo-walkthrough>.

Hamerly, et al., "Learning the Kin K-Means", Proceedings of the 7th Annual Conference on Neural Information Processing Systems (NIPS), 2003, 8 Pages. Retrieved at <http://books.nips.cc/papers/files/nips16/ NIPS2003_AA36.pdf>.

Hearst, et al., "Automatic Acquisition of Hyponyms from Large Text Corpora", Proceedings of the 14th conference on Computational linguistics (COLING), Aug. 23-28, 1992, vol. 2, pp. 539-545. Retrieved at <http://acl.eldoc.ub.rug. nl/mirror/C/C92/C92-2082.pdf>.

Jain, et al., "Domain-Independent Entity Extraction from Web Search Query Logs", Proceedings of the 20th International Conference Companion on World Wide Web (WWW), Mar. 28-Apr. 1, 2011, pp. 63-64. Retrieved at <http:// www2011india.com/proceeding/companion/p63.pdf>.

Jansen, et al., "Determining the User Intent of Web Search Engine Queries", Proceedings of the 16th international conference on World Wide Web (WWW), May 8-12, 2007, pp. 1149-1150. Retrieved at <http://wwwconference. org/www2007/posters/poster989.pdf>.

Kemke, et al., "Planning with Action Abstraction and Plan Decomposition Hierarchies", Proceedings of the IEEE/ WIC/ ACMInternational Conference on Intelligent Agent Technology (IAT), Dec. 18-22, 2006, pp. 447-451. Retrieved at <http://www.cs. umanitoba.ca/-ckemke/papers/Kemke-Walker-Planning.pdf>.

Metzinger, et al., "The Emergence of a Shared Action Ontology: Building Blocks for a Theory", Consciousness and Cognition, vol. 12, 2003, pp. 549-571. Retrieved at <http://www.philosophie.uni-mainz.de/metzinger/publikationen/Metzinger_Gallese_2003.pdf>.

Pantel, et al., "Jigs and Lures: Associating Web Queries with Structured Entities", Proceedings of the 49th Annual Meeting of the Association for Computational Linguistics (ACL), Jun. 19-24, 2011, pp. 83-92. Retrieved at <http://aclweb.org/ anthology/PIP 11/P11-1009.pdf>.

Rose, et al., "Understanding User Goals in Web Search", Proceedings of the 13th international Conference on World Wide Web (WWW), May 17-22, 2004, pp. 13-19. Retrieved at <http://www.iw3c2.org/WWW2004/docs/1p13. pdf>.

Sauper, et al., "Automatically Generating Wikipedia Articles: A Structure-aware Approach", Proceedings of the Joint Conference of the 47th Annual Meeting of the ACL and the 4th International Joint Conference on Natural Language Processing of the AFNLP, vol. 1, 2009, 9 Pages. Retrieved at <http:// people.csail.mit.edu/csauper/pubs/sauper-acl-09.pdf>.

Sekine, et, al., "Acquiring Ontological Knowledge from Query Logs", Proceedings of the 16th International Conference on World Wide Web (WWW), May 8-12, 2007, 2 Pages. Retrieved at <http://www.ra.ethz.ch/cdstore/ www2007/www2007.org/posters/poster900.pdf>.

Toutanova, et al., "Feature-Rich Part-of-Speech Tagging with a Cyclic Dependency Network", Proceedings of HTL-NAACL, May-Jun. 2003, 7 Pages. Retrieved at <http:// ww2.cs.mu.oz.au/acl/N/N03/N03-1033.pdf>.

Yin, et al., "Building Taxonomy of Web Search intents for Name Entity Queries", Proceedings of WWW, Apr. 26-30, 2010, 10 Pages. Retrieved at <http://research. microsoft.com/pubs/120889/fp0700-yin.pdf>.

Gao, et al.,, "Clickthrough-Based Latent Semantic Models for Web Search", Proceedings of SIGIR, Jul. 24-28, 2011, 10 Pages. Retrieved at <Clickthrough-Based Latent Semantic Models for Web Search>.

Curran, et al., "Language Independent NER Using a Maximum Entropy Tagger", Proceedings of the 7th CoNLL, 2003, pp. 164-167. Retrieved at <http://acl.1dc.upenn. edu/W/W03/W03-0424.pdf>.

Non-Final Office Action issued for U.S. Appl. No. 13/311,581, dated Apr. 25, 2014, 22 pages.

Final Office Action issued for U.S. Appl. No. 13/311,581, dated Aug. 8, 2014, 21 page.

Non-Final Office Action issued for U.S. Appl. No. 13/311,581, dated Jan. 15, 2015, 24 pages.

Final Office Action issued for U.S. Appl. No. 13/311,581, dated Apr. 30, 2015, 30 pages.

(56) References Cited

OTHER PUBLICATIONS

Non-Final Office Action issued for U.S. Appl. No. 13/311,581, dated Jan. 29, 2016, 69 pages.
Final Office Action issued for U.S. Appl. No. 13/311,581, dated Oct. 25, 2016, 20 pages.
Notice of Allowance issued for U.S. Appl. No. 13/311,581, dated May 22, 2017, 19 pages.
Supplemental Notice of Allowability issued for U.S. Appl. No. 13/311,581, dated Jul. 18, 2017, 6 pages.

* cited by examiner

100

*300*

*320*

*340*

MODELING ACTIONS FOR ENTITY-CENTRIC SEARCH

CROSS-REFERENCE TO RELATED APPLICATION

This application is a continuation of U.S. patent application Ser. No. 13/311,581, filed Dec. 6, 2011, and titled "MODELING ACTIONS FOR ENTITY-CENTRIC SEARCH", the application of which is incorporated herein in its entirety by reference.

BACKGROUND

A search engine is a program executed on a server that looks for data on the internet. The search engine may provide a list of one or more website links in response to a search query from a user. The search engine may compare the search query to an index. The search engine may compile the index based on metadata retrieved by a web crawler. The search engine may compare the words of the search query to the metadata to determine the best match. Other factors may also be taken into account, such as the number of links to the website on other websites and other data.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to predicting a successive action by a user based on an entity reference. The web service engine server may identify an entity reference in a data transmission caused by a user. The web service engine server may determine from the data transmission a user intention towards the entity reference using an intention model based on a transmission log. The web service engine server may predict a related successive web action option for the entity reference based on the user intention.

BRIEF DESCRIPTION OF THE DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
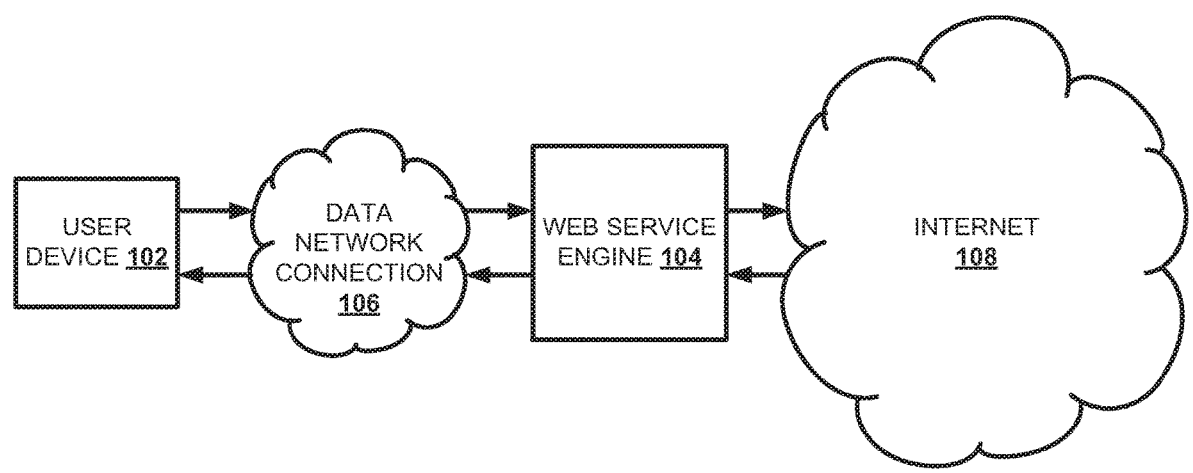
FIG. 1 illustrates, in a block diagram, one embodiment of a data network.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a web service engine server.

Many search queries contain named entities. Depending on the entity reference and the context, the user may frequently choose from a limited number of actions to perform on the entity, such as "view biography of", "see sports statistics for", "read reviews of" and others. These actions, in turn, may typically be performed at certain websites or using certain applications, including online enabled applications.

A search engine may create a query log of the search queries sent in by a sufficiently large set of users, as well as the sites that those users subsequently visited. A search engine may create a statistical intention model based on that query log to predict subsequent actions taken by a single user. A statistical intention model identifies the subsequent action that a user seeks to enable by the submitted query. For example, a user submitting the query "Star Wars reviews" may want to watch the movie Star Wars®, but wishes to read reviews beforehand to determine if the movie is worth seeing. By identifying an entity in a search query, the context words surrounding that query, and other information available in web usage logs, such as a query click history, the search engine may use the intention model to determine the intent of the user. Thus, a search engine may predict any subsequent actions that a user wants to perform, and may preemptively provide the user with a website link to an online service to perform those actions. Alternately, the search engine may preemptively provide the user with an application programming interface (API) that connects the user to a website or application capable of performing those actions. The application programming interface may be provided by the online service or by the search engine user interface. The search engine may interact with either a graphical user interface or a voice recognition program to provide these options to the user.

Further, these action predictions may be created and used by other web services, such as an e-mail service, a social network, or even a shopping service. A web service engine may use an entity reference in a data transmission, such as an e-mail or a social network posting, to provide targeted advertising to the user. The web service engine may develop an intention model based on a transmission log of user transmissions sent by a sufficiently large set of users.

Thus, in one embodiment, a web service engine server may predict a successive action by a user based on an entity reference. The web service engine server may identify an entity reference in a data transmission caused by a user. The web service engine server may determine from the data transmission a user intention towards the entity reference using an intention model based on a transmission log. The web service engine server may predict a related successive web action option for the entity reference based on the user intention.

FIG. 1 illustrates, in a block diagram, one embodiment of a data network 100 that may use an entity centric web service. A user device 102 may submit a direct data transmission, such as a search query, to a web service engine server 104, such as a search engine server, over a data network connection 106. The web service engine server 104 may identify sites on the internet 108 that respond to the search query.

Alternatively, the web service engine server 104, such as an e-mail server or a social network server, may intercept an indirect data transmission from the user device, such as an e-mail or a posting on a public forum or a social network. The web service engine server 104 may use an entity reference in the data transmission to determine a user intention indicated by the data transmission. An entity reference is a reference to an event, a location, a virtual entity, or a tangible entity. The web service engine server 104 may develop an intention model based on a transmission log to model a user intention. The web service engine server 104 may use the intention model and the entity reference to determine the user intention.

The web service engine server 104 may then predict one or more related successive web action options based on the user intention. A related successive web action option is a possible action the user may take on the internet after the search query in furtherance of the user intention. Each related successive web action option may be associated with one or more website links that may lead to a website where the user may perform the related successive web action option. Alternately, a successive web action option may be associated with an application programming interface connecting the user to a website or application to perform the related successive web action option, such as a banking application or other applications. The related successive web action option set, the associated website links, and the application programming interfaces may be ranked in order of usability, as determined by the probabilities suggested by the intention model.

Figure 2:
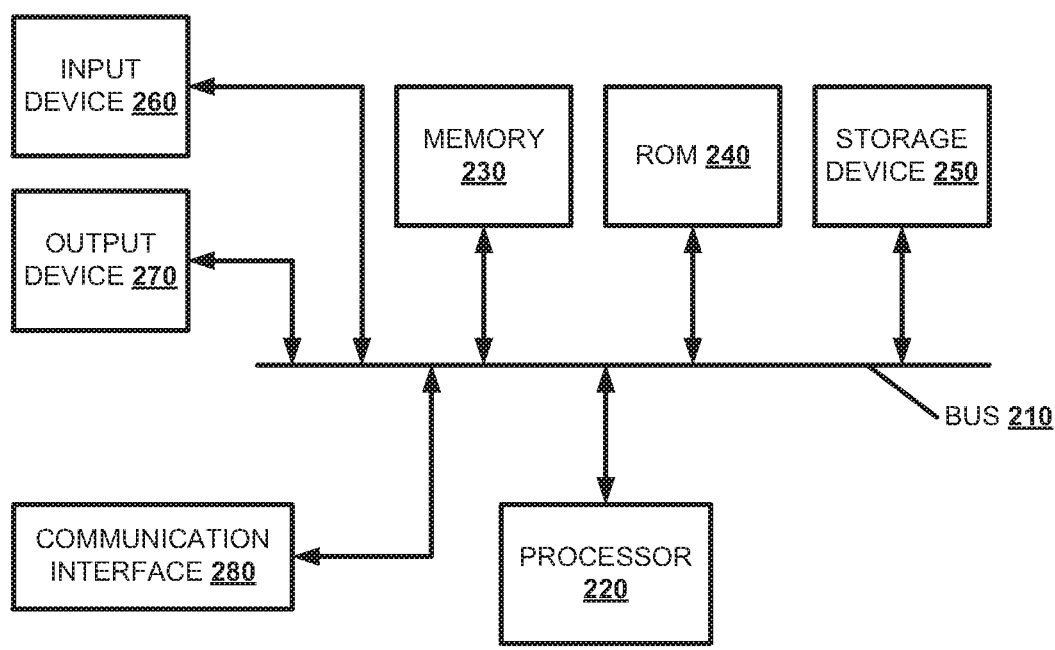
FIG. 2 illustrates, in a block diagram, one embodiment of a computing device.

FIG. 2 illustrates a block diagram of an exemplary computing device 200 which may act as a user device 102 or a web service engine server 104. The computing device 200 may combine one or more of hardware, software, firmware, and system-on-a-chip technology to implement the entity-centric web service. The computing device 200 may include a bus 210, a processor 220, a memory 230, a read only memory (ROM) 240, a storage device 250, an input device 260, an output device 270, and a communication interface 280. The bus 210 may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The ROM 240 may include a conventional ROM device or another type of static storage device that stores static information and instructions for the processor 220. The storage device 250 may include any type of tangible machine-readable medium, such as, for example, magnetic or optical recording media and its corresponding drive. A tangible machine-readable medium is a physical medium storing machine-readable code or instructions, as opposed to a transitory medium or signal. The storage device 250 may store a set of instructions detailing a method that when executed by one or more processors cause the one or more processors to perform the method. The storage device 250 may also be a database or a database interface for storing website links, intention models, and action phrasings.

The input device 260 may include one or more conventional mechanisms that permit a user to input information to the computing device 200, such as a keyboard, a mouse, a voice recognition device, a microphone, a headset, etc. The output device 270 may include one or more conventional mechanisms that output information to the user, including a display, a printer, one or more speakers, a headset, or a medium, such as a memory, or a magnetic or optical disk and a corresponding disk drive. The communication interface 280 may include any transceiver-like mechanism that enables computing device 200 to communicate with other devices or networks. The communication interface 280 may include a network interface or a transceiver interface. The communication interface 280 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the storage device 250, or from a separate device via the communication interface 280.

Figure 3A:
FIGS. 3a-c illustrate, in block diagrams, different embodiments of data transmissions providing an entity reference.

The web service engine server 104 may identify an entity reference in a data transmission, such as a search query, an e-mail, or a social network post. FIG. 3a illustrates, in a block diagram, one embodiment of a search query 300. The search query 300 is a query entered directly into a search engine. The search query 300 may have an entity reference 302. The entity reference 302 describes the tangible entity, virtual entity, location or event that the user intends to act upon. For example, the entity reference 302 may be "restaurant", "Black Keys"®, "Star Wars"®, or "Hope Solo". The search query 300 may have one or more context words 304 on either side of the entity reference 302. A context word 304 describes the context in which the user intends to use the entity reference 302. For example, the context word 304 may be "reservations", "tickets", or "stats". The intent may be inferred even when the context word 304 is empty.

Figure 3B:

If the web service engine server 104 is attached to a mail server, the web service engine server 104 may passively read the e-mail of a user. FIG. 3b illustrates, in a block diagram, one embodiment of an e-mail 320. The e-mail 320 may have an address 322 indicating the destination of the e-mail. The e-mail 320 may have a message body 324 presenting the message being sent to the address 322. An entity reference 302 and one or more context words 304 may be embedded in the message body 324 of the e-mail 320. For example, the body of the e-mail may read: "I am taking my wife to the French Laundry for dinner tomorrow." The entity reference 302 may be "French Laundry," while the context words 304 may be "dinner" and "tomorrow". Thus, the web service engine server 104 may determine that the user intends to go to dinner tomorrow at the French Laundry, predict that the next action of the user may be to make reservations, and provide an application programming interface to make reservations at the French Laundry.

Figure 3C:
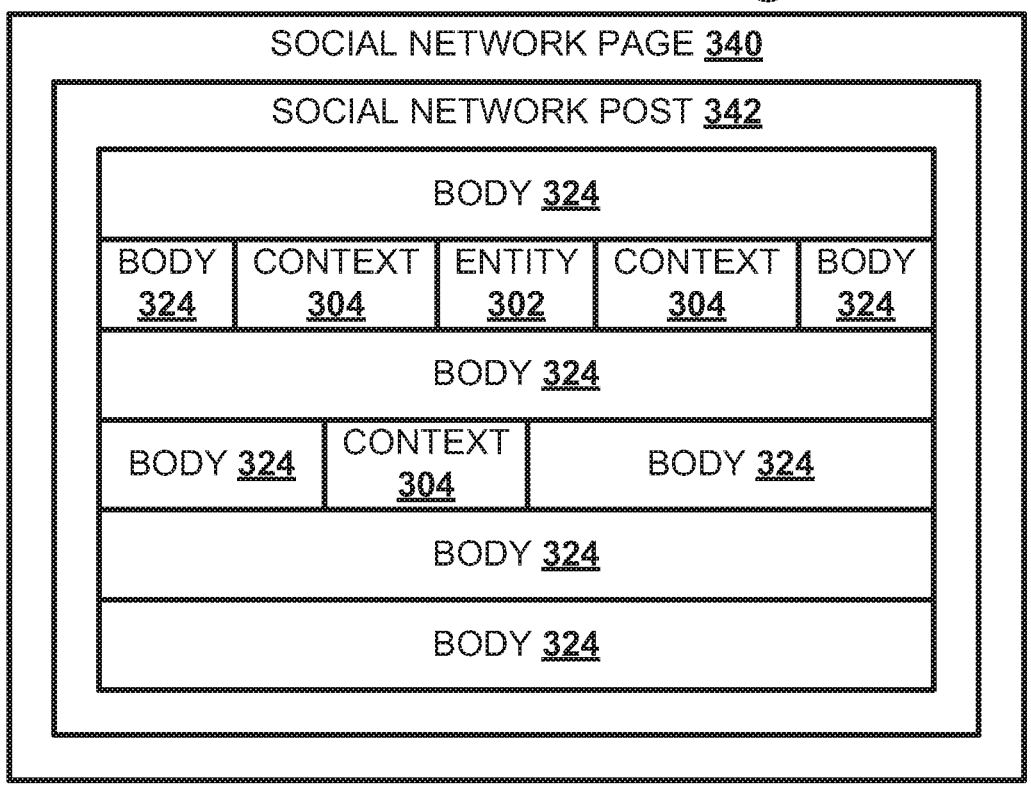

The web service engine server 104 may crawl a social network page associated with the user. FIG. 3c illustrates, in a block diagram, one embodiment of a social network page 340. The social network page 340 may have a social network post 342 attributable to a user. The social network post 342 may have an entity reference 302 and one or more context words 304 embedded in the post body 324. For example, the social network post 342 may read: "I am looking forward to attending the Niners' game tomorrow." The entity reference 302 may be "Niners' game" and the context words may be "attending". The web service engine server 104 may determine that the user intends to attend a San Francisco Forty-Niners' ® game, and that a successive action may be to order a Forty-Niners' jersey to wear to the game. The web service engine server 104 may recommend a website link to a paraphernalia store.

The web service engine server 104 may use a transmission log to develop an intention model. A transmission log is a collection of user transmissions, such as a search query, an e-mail, or a social network post. The transmission log may collect user transmissions from multiple users or may focus on user transmissions from a single user. An intention model may be used to predict the probability of a specific user intention resulting in a specific user action.

The web service engine server 104 may use the intention model to automatically learn the underlying actions intended in a user transmission, as well as to recommend actions given a new user transmission. The intention model may probabilistically describe a generation process for a user transmission containing an entity and underlying action intent. The intention model may assume that a user transmission is governed by latent actions and entity types, which influence the choice of query terms and clicks. The intention model may use inference procedures to infer actions after learning these models by maximizing the probability through observing a large collection of real-world user transmissions and the resulting clicked hosts.

Figure 4A:
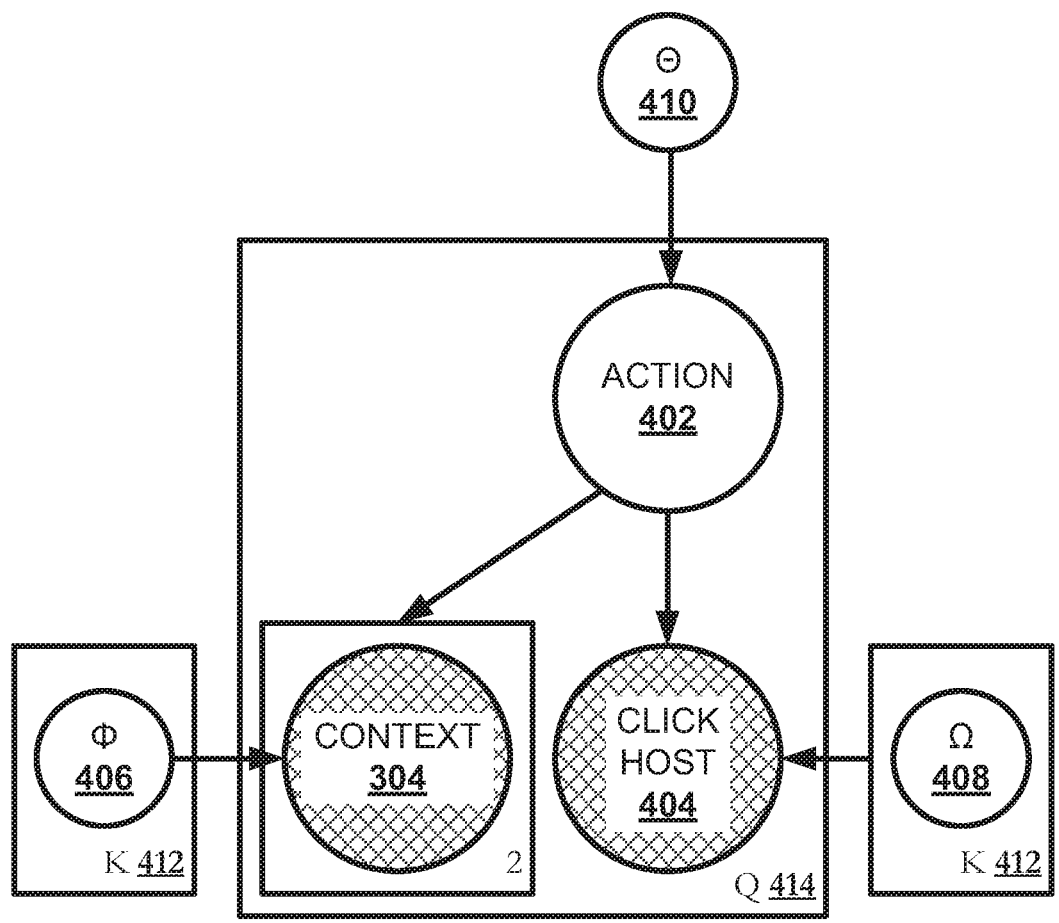
FIGS. 4a-c illustrate, in plate diagrams, embodiments of intention models.

A web service engine may use multiple types of intention models. For example, FIG. 4a illustrates, in a block diagram, one embodiment of a simplified intention model 400. A simplified intention model 400 may use one or more context words (n) 304 to create an action prediction 402 to be taken by the user. The viability of the action prediction (a) 402 may be measured by comparing a host website clicked by the user in a continuation of the user transmission, referred to as the click through host (c) 404. The click through host 404 may be a website link presented in response to a search query and selected by a user, or a website selection by a user after sending an e-mail or posting a social network post. The context words 304 and click through host 404 may be directly observable by the web service engine. The simplified intention model 400 may have a context multinomial set of parameters ($\phi$)) 406 describing the distribution of the context words 304, a host multinomial set of parameters ($\Omega$) 408 describing the distribution of the click through host 404, and an action multinomial set of parameters ($\Theta$) 410 describing the distribution of the action prediction 404.

For a user transmission of "Star Wars review," the intention model may generate the action "read reviews." Based on this action, the intention model may choose a null context word 304 and a context word 304 of "review." The intention model may generate a click on a site such as "rottentomatoes.com."

The joint probability of the intention model may be the product of the conditional distributions, as given by:

$$P(a, q=n_1, n_2, c | \Theta, \phi, \Omega) = P(a|\Theta) P(n_1|a,\phi) P(n_2|a,\phi) P(c|a,\Omega)$$

Next, the intention model 400 may define each of the terms in the joint distribution. The intention model 400 may define K as the number of latent actions 412 that govern the transmission log, where K 412 is fixed in advance. Then, the probability of action prediction a 402 may be defined as a multinomial distribution with probability vector $\Theta$ 410, such that the probability of a particular action may be given by:

$$P(a = \hat{a}) = \prod_{k=1}^{K} \Theta_k^{I[k=\hat{a}]}, \text{ s.t. } \sum_k \Theta_k = 1$$

where 1 is an indicator function set to 1 if the condition holds, and 0 otherwise.

The intention model 400 may define V as the shared vocabulary size of all context words $n_1$ and $n_2$ 304. Given an action prediction a 402, the probability of generating a context word n 304 may be given by a multinomial distribution with probability vector $\phi_a$ 406 such that $\phi=[\phi_1, \ldots, \phi_k]$ represents parameters across actions:

$$P(n = \hat{n} | a = \hat{a}) = \prod_{v=1}^{V} \Phi_{\hat{a},v}^{I[v=\hat{n}]}, \text{ s.t. } \forall a \sum_{v=1}^{V} \Phi_{a,v} = 1$$

Finally, the intention model 400 may assume H possible click values, corresponding to H click through hosts 404. A click on a host may be determined by an action. Given an action prediction a 402, the intention model 400 may assume the probability of generating a click through host c 404 is a multinomial with a probability vector $\omega_a$ 408 such that $\Omega=[\omega_1, \ldots, \omega_K]$ captures the matrix of parameters across all K actions 412. In particular:

$$P(c = \hat{c} | a = \hat{a}) = \prod_{h=1}^{H} \Phi_{\hat{a},h}^{I[h=\hat{c}]}, \text{ s.t. } \forall a \sum_{h=1}^{H} \Phi_{a,h} = 1$$

Given a query, the intention model 400 may apply Bayes' rule to find the posterior distribution over the actions. In particular, the posterior distribution, P(a|q,c), may be directly proportional to the joint distribution. The intention model may compute this distribution by evaluating the joint for every value of a and the observed configuration of q and c.

Given a transmission log Q 414 having N independently and identically distributed transmissions (each $q^j=\{n_1^j n_2^j\}$) and the corresponding clicked through hosts 404, the intention model 400 may estimate the parameters $\phi$ 410, $\phi$ 406, and $\Omega$ 408 that maximize the (log) probability of observing Q 414. The log P(Q) may be written as:

$$\log P(Q) = \sum_{j=1}^{N} \sum_{a} P^j(a | q, c) \log P^j(q, c, a)$$

In the above equation, $P^j$(a|q, c) may represent the posterior distribution over actions for the $j^{th}$ query. The intention model 400 may use an expectation maximization process to set the parameters. Starting with a random initialization of the parameters, the intention model 400 may iterate between the expectation step, in which $P^j$(a|q,c) may be computed for each user transmission, and the maximization step, in which the parameters may be updated by fixing $P^j(a|q, c)$ to the values computed in the expectation step.

The intention model 400 may obtain parameter updates by computing the derivative of log P(Q) with respect to each parameter, and setting the resultant to 0. The update for Θ 410 may be given by the average of the posterior distributions over the actions:

$$\theta_{\hat{a}} = \frac{\sum_{j=1}^{N} P^j(a = \hat{a} | q, c)}{\sum_{j=1}^{N} \sum_a P^j(a | q, c)}$$

For a fixed a, the intention model 400 may give the update for $\phi_a$ 406 by the weighted average of the context words 304, where the weights are the posterior distributions over the action predictions 402, for each user transmission. In particular:

$$\Phi_{\hat{a},\hat{n}} = \frac{\sum_{j=1}^{N} P^j(a = \hat{a} | q, c)[I[n_1^j = \hat{n}] + I[n_2^j = \hat{n}]]}{2\sum_{j=1}^{N} P^j(a = \hat{a} | q, c)}$$

Similarly, the intention model 400 may update Ω 408, the parameters 408 that govern the distribution over clicked through hosts 404 for each action prediction 402. For a fixed action prediction a 402, the intention model 400 may be updated by taking the weighted average of the clicked through hosts 404, with weights provided by the posterior distribution over the actions:

$$\Omega_{\hat{a},\hat{n}} = \frac{\sum_{j=1}^{N} P^j(a = \hat{a} | q, c)I[c^j = \hat{c}]}{\sum_{j=1}^{N} P^j(a = \hat{a} | q, c)}$$

Figure 4B:
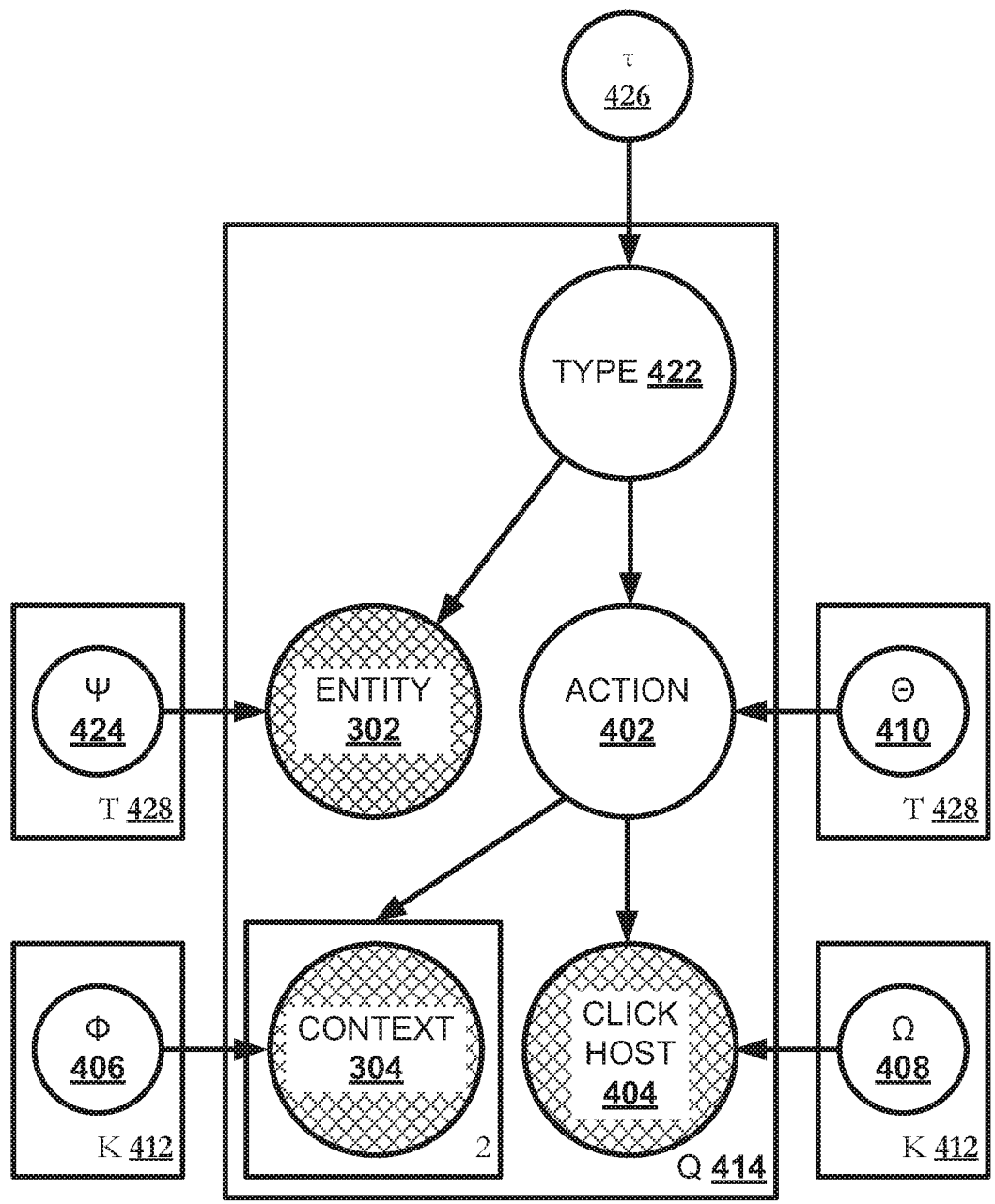

FIG. 4b illustrates, in a block diagram, one embodiment of a more complex intention model 420. The intention model 420 may consider the entity reference 302 when determining the action prediction 402. The entity reference 302, the context words 304, and the click through host 404 may be directly observable when creating the simplified intention model 400. A more complex intention model 420 may include an entity type 422. An entity type 422 is a categorization of an entity. For example, the entity reference 302 "Star Wars"® may have an entity type 422 of "Movie". Inclusion of the entity type 422 tends to have such an impact on an action prediction 402 that the entity type 422 may be excluded from initial construction of the intention model 420. The intention model 420 may have an entity multinomial set of parameters (LP) 424 describing the distribution of the entity 302 and a type multinomial set of parameters (i) 426 describing the distribution of the entity type 422.

The joint probability over the model variables may be:

$$P(t,a,q=\{n_1,e,n_2,\}c|\Theta,\phi,\Omega,\tau,\Psi)=P(t|\tau)P(a|t,\Theta)P(e|t,\Psi)P(c|a,\Omega)P(n_1|a,\phi)P(n_2|a,\phi)$$

Next, the intention model 420 may describe each term in the joint probability. Let T be the number 428 of entity types 422. The probability of generating an entity type t 422 may be governed by a multinomial with a probability vector τ 426. In particular:

$$P(t = \hat{t}) = \prod_{i=1}^{T} \tau_i^{I[i=\hat{t}]}, \text{ s.t. } \sum_{i=1}^{T} \tau_i = 1$$

The intention model 420 may set E as the number of known entities. The probability of generating an entity e 302 given entity type t 422 may be a multinomial with a probability vector $\Psi_t$ 424 such that $\Psi=[\Psi_1, \ldots, \Psi_\tau]$ captures the matrix of parameters across all T 428 types 422. In particular:

$$P(e = \hat{e} | t = \hat{t}) = \prod_{i=1}^{E} \Psi_{t,i}^{I[i=\hat{e}]}, \text{ s.t. } \forall t \sum_{i=1}^{E} \Psi_{t,i} = 1$$

Since actions may be conditioned on types for every value of type, the entity type 422 may be represented by a multinomial distribution with probability vector Θ 410$_t$ such that $\Theta=[\Theta, \ldots, \Theta_\tau]$ represents parameters across types:

$$P(a = \hat{a} | t = \hat{t}) = \prod_{k=1}^{K} \Theta_{t,k}^{I[k=\hat{a}]}, \text{ s.t. } \forall t \sum_{k=1}^{K} \Theta_{t,k} = 1$$

Prior distributions over the context words 304 and click through host 404 may remain unchanged as the simplified intention model 400.

Given a query, the complex intention model 420 may apply Bayes' rule to find the posterior distribution, P(a, t|q, c), over the actions, as proportional to P(a,t,q,c). The complex intention model 420 may compute this quantity by evaluating the joint for each combination of action prediction a 402 and entity type t 422, and the observed values of q and c.

During inference, the complex intention model 420 may enforce that an entity may have certain admissible types. As an example, if the entity is Star Wars®, valid types include film and book. The complex intention model 420 may set the posterior probability of invalid types to zero. The complex intention model 420 may obtain the set of admissible types for every entity using an external knowledge base.

As with the simplified intention model 400, the complex intention model 420 may perform maximum likelihood estimation of the parameters using the expectation maximization process. The maximization may further include these equations for the following complex parameters:

$$\tau_{\hat{t}} = \frac{\sum_{j=1}^{N} \sum_a P^j(a, t = \hat{t} | q, c)}{\sum_{j=1}^{N} \sum_{a,t} P^j(a, t | q, c)}$$

$$\Psi_{\hat{t},\hat{e}} = \frac{\sum_{j=1}^{N} \sum_a P^j(a, t = \hat{t} | q, c)I[e^j = \hat{e}]}{\sum_{j=1}^{N} \sum_a P^j(a = \hat{a} | q, c)}$$

Figure 4C:
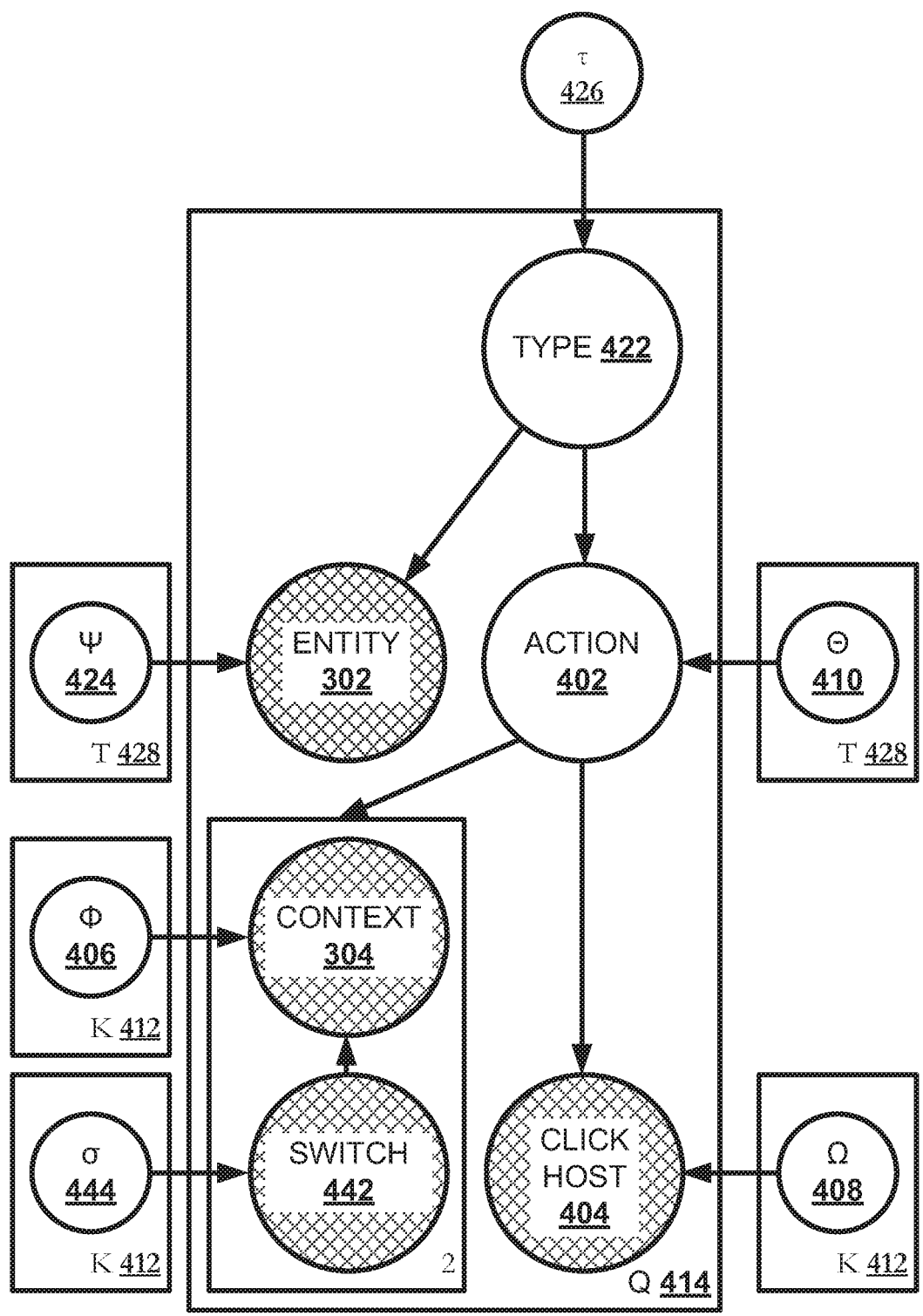

In a search query, a context word 304 may be left empty. For example, a user may query for "Star Wars" instead of adding refiners such as "Star Wars reviews" or "Star Wars tickets." FIG. 4c illustrates, in a block diagram, one embodiment of an empty context intention model 440. In order to compensate, the empty context intention model 440 may explicitly represent an empty context word 304 using a switch variable 442 that determines whether a context word 304 may be empty. The empty context intention model 440 may have an entity multinomial set of parameters (σ) 444 describing the distribution of the switch variable 442.

The empty context intention model 440 may be:

$$P(t,a,q=\{n_1,e,n_2\},c,s=\{s_1,s_2\}|\Theta,\phi,\Omega,\tau,\Psi,\sigma)=P(t|\tau)P(a|t,\Theta)P(e|t,\Psi)P(c|a,\Omega)\Pi_{i=1}^{2}P(ni|a,\phi)^{I[s_i=1]}P(n2|a,\phi)$$

The probability of generating an empty or non-empty context word s 304 given an action prediction a 402 may be given by a Bernoulli distribution with switch parameter $\sigma_a$ 444:

$$P(s|a=\hat{a})=\sigma_{\hat{a}}^{I[i=\hat{i}]}(1-\sigma_{\hat{a}})^{I[s=0]}$$

The maximization function for the switch parameter σ 444:

$$\sigma_{\hat{a}} = \frac{\sum_{j=1}^{N}\sum_{t} P^{j}(a=\hat{a},t|q,c,s)I[I[s_1=1]+I[s_2=1]]}{2\sum_{j=1}^{N}\sum_{t} P^{j}(a=\hat{a},t|q,c,s)}$$

A web service engine may take a Bayesian approach and treat these parameters as variables, possibly with Dirichlet and Beta prior distributions, and perform Bayesian inference.

In using the intention model, the user may submit a search query 300 to the web service engine server 104 of "Star Wars review". The user may then click on the website rottentomatoes.com. The web service engine server 104 may model the search query 300 by labeling "Star Wars" as the entity reference 302. The web service engine server 104 may label the word "review" as a context word 304. The web service engine server 104 may label www.rottentomatoes.com as the click through host 404. The web service engine server 104 may determine that the entity type 422 is "Film". Thus, the web service engine server 104 may determine that a predicted action 402 is "read a review".

Figure 5A:
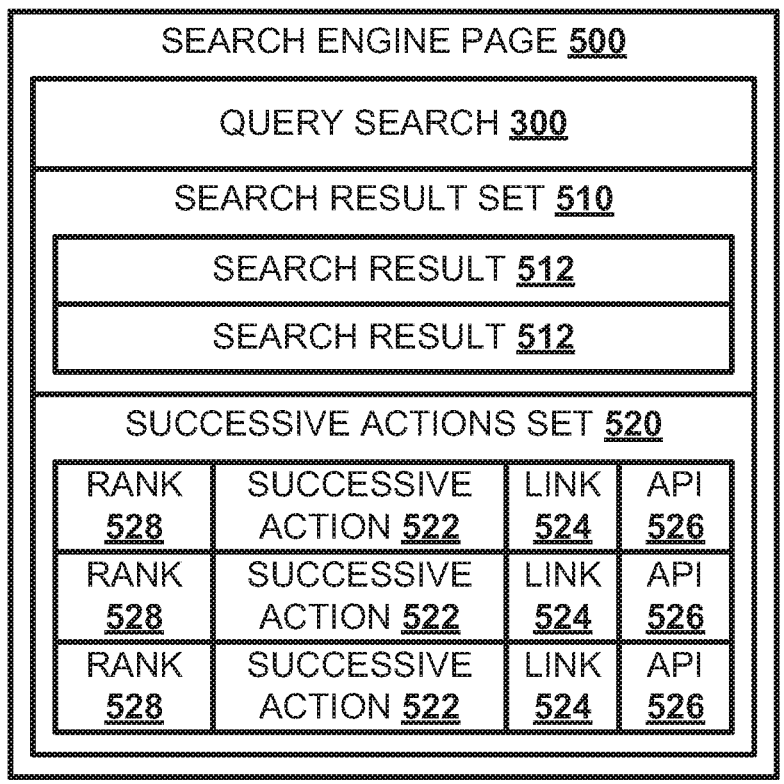
FIGS. 5a-b illustrate, in block diagrams, embodiments of a presentation user interface.

The web service engine server 104 may use the intention model on a data transmission to predict a future action by the user. The action predictions 402 may be in response to a direct data transmission, such as a search query 300, or gleaned from an indirect data transmission, such as an e-mail 320 or a social network post 340. FIG. 5a illustrates, in a block diagram, one embodiment of a search engine page 500 that may present the resulting action predictions 402 to the user. While a graphical user interface is shown, other user interfaces, such as a natural user interface using voice recognition, may also be used. The search engine page 500 may present the search query 300 to the user. The search engine page may present a standard search result set 510, listing a set of direct search results 512. For example, a search query 300 of "Girl with the Dragon Tattoo movie" may result in a direct search result 512 of the website set up by the production company. The search engine page 500 may provide a related successive web action option set 520 for the search query 300. The related successive web action option set 520 may have one or more related successive web action options 522, each with an associated website link 524 or application programming interface 526. Per the previous example, the related successive web action option 522 may be "read a review" with a link to Rotten Tomatoes®, "buy a ticket" with a Fandango® application, or "download a digital copy" with a link to Amazon®. Each related successive web action option 522 may have a rank 528, allowing the related successive web action options 522 to be arranged from most likely to least likely, as determined by the intention model.

Figure 5B:
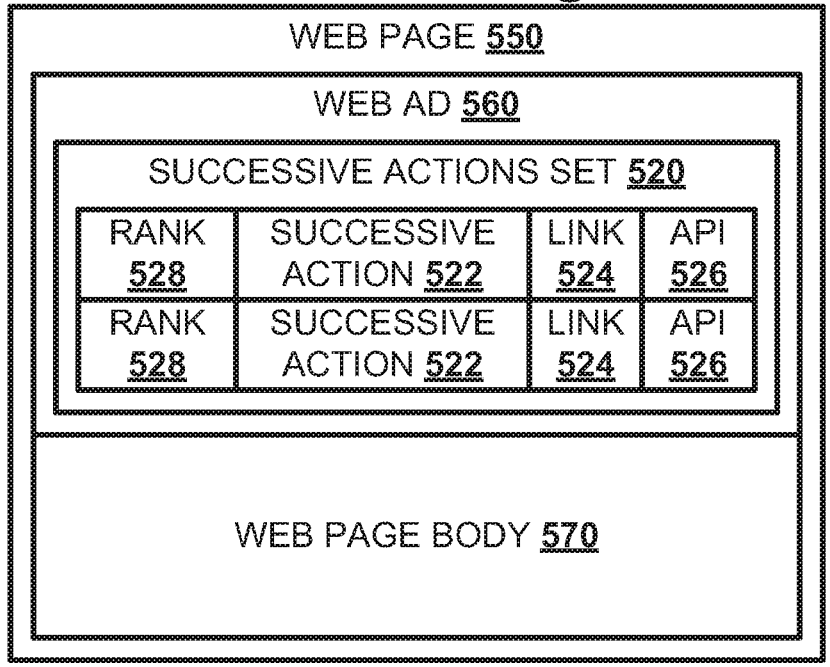

Alternately, the action predictions 402 may be gleaned from an indirect data transmission, such as an e-mail 320 or a social network post 340. Thus, the action predictions 402 may be incorporated into a web page, such as an e-mail account, a blog, or a social network post. FIG. 5b illustrates, in a block diagram, one embodiment of a web page 550 that may present the resulting action predictions 402 to the user. While a graphical user interface is shown, other user interfaces, such as a natural user interface using voice recognition, may also be used. The web page 550 may provide a related successive web action option set 520 in a web page advertisement 560. The web page advertisement 560 may be in a banner advertisement over a web page body 570.

Figure 6:
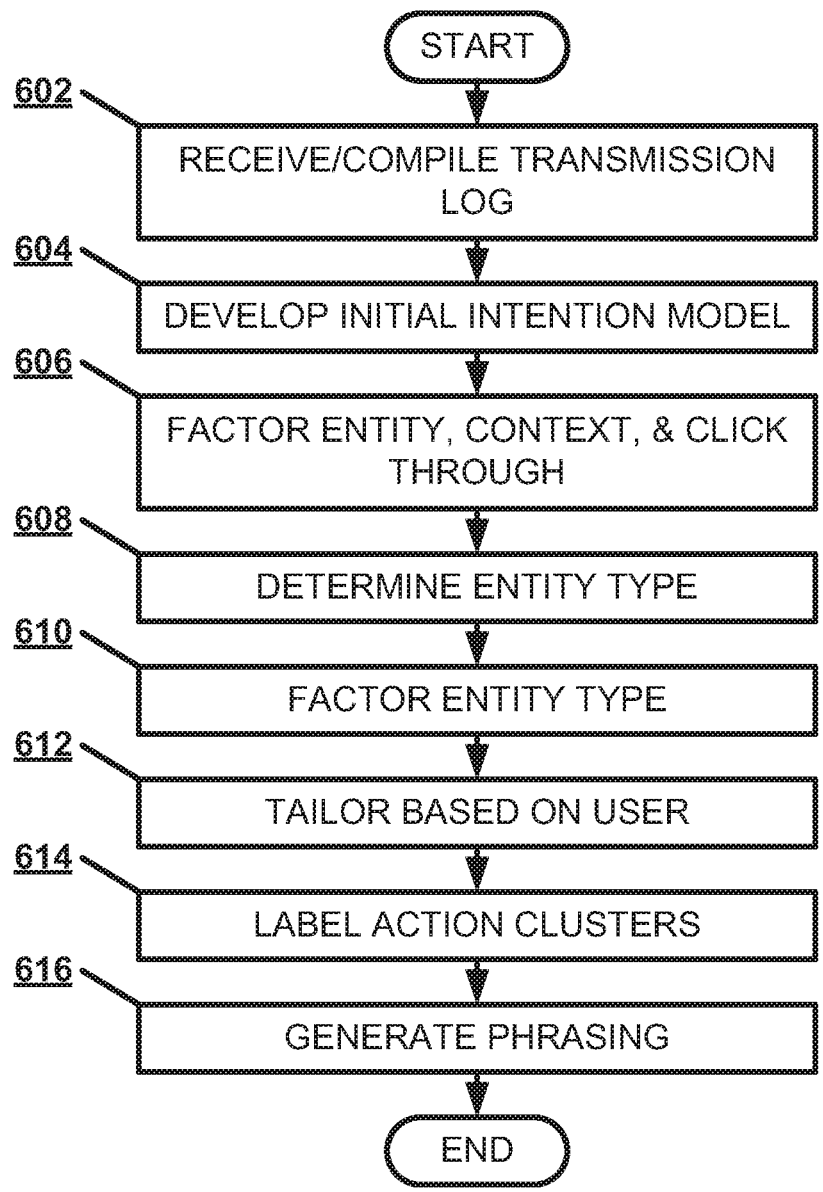
FIG. 6 illustrates, in a flowchart, one embodiment of a method creating a search intention model.

FIG. 6 illustrates, in a flowchart, one embodiment of a method 600 creating a search intention model. The web service engine server 104 may receive or compile a transmission log of user transmissions over a large set of users, such as search queries, e-mails, or social network posts (Block 602). The web service engine server 104 may develop a simplified intention model 400 based on the transmission log to model the user intention (Block 604). The web service engine server 104 may factor at least one of an entity reference 302, a click through host 404, and a context word 304 into the intention model 400 (Block 606). The web service engine server 104 may determine an entity type 422 for each entity reference 302 in the transmission log (Block 608). The web service engine server 104 may factor the entity type 422 into later construction of a complex intention model 420 (Block 610). The web service engine server 104 may exclude the entity type 422 from initial construction of the intention model 400 to prevent the entity type 422 from overwhelming the other factors. The web service engine server 104 may tailor the intention model to an individual user (Block 612). The web service engine server 104 may consider demographic information about the user or prior search and click history.

The web service engine server 104 may generate the action phrasing by clustering phrases found in a large corpus of phrases, such as the Internet 108. The web service engine server 104 may filter the clustered phrases to remove adverbs and noise, paring the words down to action verbs. The web service engine server 104 may further filter the action verbs to remove any actions that may not be performed online. The web service engine server 104 may then pair those action verbs with a location or object. At block 614, the web service engine server 104 may label an action cluster of the intention model. At block 616, the web service engine server 104 may generate automatically an action phrasing for a related successive web action option using the labeled action cluster. Alternatively, the action phrasing may be generated, supplemented, or edited by a human administrator.

Figure 7:
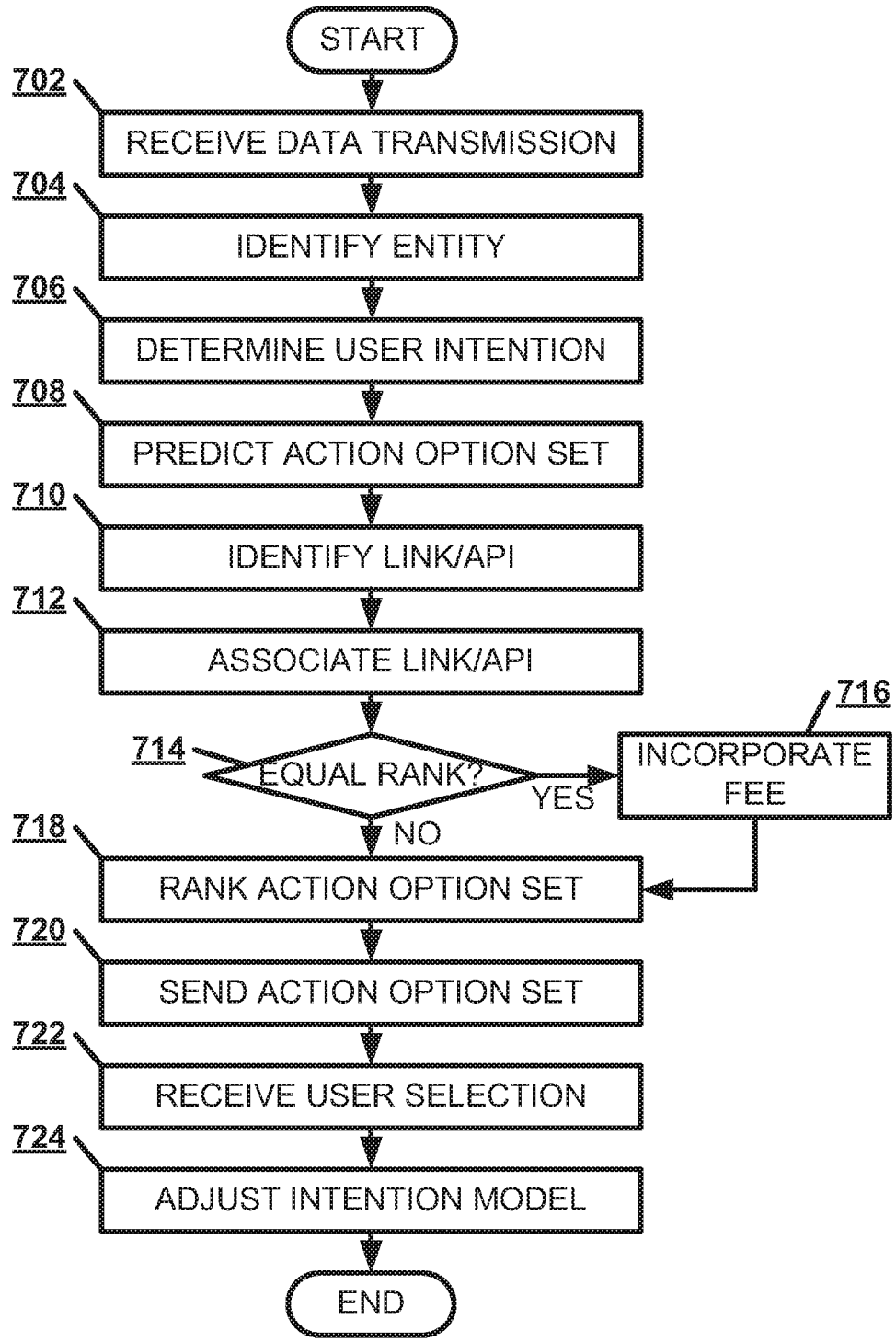
FIG. 7 illustrates, in a flowchart, one embodiment of a method of using the search intention model on an entity reference.

FIG. 7 illustrates, in a flowchart, one embodiment of a method 700 of using the search intention model on an entity reference. The web service engine server 104 may receive a data transmission caused by an individual user (Block 702).

The data transmission may be a search query 300, an e-mail 320, or a social network post 340. The web service engine server 104 may identify an entity reference 302 in the data transmission caused by the user (Block 704). The web service engine server 104 may identify the entity reference in at least one of a search query, an e-mail, or a social network post. The web service engine server 104 may determine from the data transmission a user intention towards the entity reference using an intention model based on a transmission log (Block 706). The web service engine server 104 may predict a related successive web action option set 520 for the entity reference based on the user intention towards the entity reference according to the intention model (Block 708).

The web service engine server 104 may identify a website link 524 or an application programming interface 526 for performing a related successive web action option 522 (Block 710). A website administrator may indicate that the website performs a related successive web action by placing the action phrasing for that related successive web action option 522, as provided by the web service engine server 104, in a metadata tag for that website. Thus, the web service engine server 104 may identify at least one of a website link 524 or application programming interface 526 having the related successive web action option 522 in a metadata tag. The web service engine server 104 may associate at least one of the website link 524 or the application programming interface 526 with the related successive web action option 522 (Block 712).

If two related successive web action options 522 in the related successive web action option set 520 have an equal probability of being chosen (Block 714), the web service engine server 104 may incorporate a monetization factor into ranking the related successive web action option set 520 or in selecting a website link 524 or application programming interface 526 (Block 716). A monetization factor may be an advertisement fee, a paid action placement, a lead generation, an on-site commercial transaction, or other payment processes. The web service engine server 104 may rank the related successive web action options 522 in the related successive web action option set 520 (Block 718).

The web service engine server 104 may send the related successive web action option set 520 to a user device 102 for presentation to the user (Block 720). The related successive web action option set 520 may be just a portion of available related successive web action options. The user device 102 may present the related successive web action option set 540 to the user through any kind of user interface, such as a graphical user interface or a natural user interface. The web service engine server 104 may receive a user selection of a website link 524 associated with a related successive web action option 522 (Block 722). The web service engine server 104 may adjust the intention model based on the user selection (Block 724).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
   identifying, via a processor, an entity reference in a data transmission received from a natural user interface via a network;
   developing, via the processor, an intention model based on a transmission log comprising user transmissions, a context word distribution, and a click through host distribution;
   predicting, via the processor, a related successive web action option for the entity reference based on the intention model and the entity reference, by inferring the related successive web action option based on a probability through observing a collection of real-world user transmissions and resulting clicked hosts in the transmission log;
   generating automatically, via the processor, an action phrasing for the related successive web action option based on a labeled action cluster of the intention model by filtering clustered phrases found in a corpus of phrases to remove adverbs and preserve action verbs;

identifying, via the processor, a website link or an application programming interface having the generated action phrasing for the related successive web action option in a metadata tag;

sending the related successive web action option to a user device for presentation to a user via the natural user interface; and performing, via the processor, an action on the website link or the application programming interface based on the related successive web action option.

2. The method of claim 1, wherein the natural user interface comprises a voice recognition program.

3. The method of claim 1, comprising adjusting, via the processor, the intention model based on an action phrasing set and a user selection of the related successive web action option from a related successive web action option set.

4. The method of claim 3, comprising ranking the related successive web action option in the related successive web action option set.

5. The method of claim 1, wherein the related successive web action option is associated with one or more website links for performing the related successive web action option.

6. The method of claim 1, wherein predicting the related successive web action option for the entity reference is further based on one or more context words in the data transmission.

7. The method of claim 1, comprising determining an entity type for the entity reference.

8. The method of claim 1, comprising factoring an entity type into the intention model.

9. The method of claim 1, comprising tailoring the intention model to the user.

10. The method of claim 1, wherein the entity reference comprises a tangible entity, a virtual entity, a location, or an event.

11. The method of claim 1, wherein the data transmission comprises a search query or an email.

12. The method of claim 1, wherein the data transmission comprises a posting on a public website or a social network.

13. A tangible machine-readable medium having a set of instructions that, in response to being executed by one or more processors, cause the one or more processors to:

receive a data transmission via a natural user interface and a transmission log comprising a context word distribution and a host distribution;

identify an entity reference in the data transmission;

develop an intention model using the context word distribution and the host distribution;

predict a related successive web action option for the entity reference using the intention model and the entity reference, by inferring the related successive web action option based on a probability through observing a collection of real-world user transmissions and resulting clicked hosts in the transmission log;

automatically generate an action phrasing for the related successive web action option based on a labeled action cluster of the intention model by filtering clustered phrases found in a corpus of phrases to remove adverbs and preserve action verbs;

identify a website link or an application programming interface having the generated action phrasing for the related successive web action option in a metadata tag;

send the related successive web action option to a user device for presentation to a user via the natural user interface; and perform an action on the website link or the application programming interface based on the related successive web action option.

14. A search engine server, comprising:

a communication interface configured to receive a search query from a voice recognition program via a network; and a processor configured to:

identify an entity reference in the search query;

develop a simplified intention model based on a transmission log comprising user transmissions of a plurality of users, wherein the processor is to factor the entity reference, a host, a context word, or any combination thereof, into the simplified intention model;

determine an entity type for the entity reference;

develop a complex intention model based on the entity type;

predict a related successive web action option for the entity reference based on the complex intention model and the entity reference, by inferring the related successive web action option based on a probability through observing a collection of real-world user transmissions and resulting clicked hosts in the transmission log;

automatically generate an action phrasing for the related successive web action option based on a labeled action cluster of the simplified intention model by filtering clustered phrases found in a corpus of phrases to remove adverbs and preserve action verbs;

identify a website link or an application programming interface having the generated action phrasing for the related successive web action option in a metadata tag;

send the related successive web action option to a user device for presentation to a user via a natural user interface; and perform an action on the website link or the application programming interface based on the related successive web action option.

* * * * *